(12) United States Patent
Magdych et al.

(10) Patent No.: US 7,003,561 B1
(45) Date of Patent: Feb. 21, 2006

(54) SYSTEM, METHOD AND COMPUTER PROGRAM PRODUCT FOR IMPROVED EFFICIENCY IN NETWORK ASSESSMENT UTILIZING A PORT STATUS PRE-QUALIFICATION PROCEDURE

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: McAfee, Inc., Santa Clara, CA (US)

( * ) Notice: Subject to any disclaimer, the term of this patent is extended or adjusted under 35 U.S.C. 154(b) by 809 days.

(21) Appl. No.: 09/895,535

(22) Filed: Jun. 29, 2001

(51) Int. Cl.
    *G06F 15/16* (2006.01)
(52) U.S. Cl. .......................... 709/223; 726/22; 726/25
(58) Field of Classification Search ........ 709/220–227; 713/200–201; 370/245; 714/30; 726/22, 726/25

See application file for complete search history.

(56) References Cited

U.S. PATENT DOCUMENTS

| | | | | |
|---|---|---|---|---|
| 5,559,883 A | * | 9/1996 | Williams ................... | 713/201 |
| 5,734,824 A | * | 3/1998 | Choi ......................... | 709/224 |
| 5,805,801 A | * | 9/1998 | Holloway et al. .......... | 713/201 |
| 5,892,903 A | * | 4/1999 | Klaus ........................ | 713/201 |
| 6,070,244 A | * | 5/2000 | Orchier et al. ............. | 713/201 |
| 6,073,240 A | * | 6/2000 | Kurtzberg et al. ......... | 713/200 |
| 6,182,146 B1 | * | 1/2001 | Graham-Cumming, Jr. . | 709/238 |
| 6,185,689 B1 | * | 2/2001 | Todd, Sr. et al. .......... | 713/201 |
| 6,205,552 B1 | * | 3/2001 | Fudge ....................... | 713/201 |
| 6,219,805 B1 | * | 4/2001 | Jones et al. ................ | 714/38 |
| 6,226,372 B1 | * | 5/2001 | Beebe et al. ............... | 379/189 |
| 6,301,668 B1 | * | 10/2001 | Gleichauf et al. .......... | 713/201 |
| 6,321,338 B1 | * | 11/2001 | Porras et al. .............. | 713/201 |
| 6,324,656 B1 | * | 11/2001 | Gleichauf et al. .......... | 714/37 |
| 6,574,737 B1 | * | 6/2003 | Kingsford et al. ......... | 713/201 |
| 2001/0034847 A1 | * | 10/2001 | Gaul, Jr. .................... | 713/201 |
| 2002/0184533 A1 | * | 12/2002 | Fox ........................... | 713/201 |

FOREIGN PATENT DOCUMENTS

WO          00/54458          9/2000

* cited by examiner

*Primary Examiner*—Andrew Caldwell
*Assistant Examiner*—Benjamin A. Ailes
(74) *Attorney, Agent, or Firm*—Zilka-Kotab, PC; Christopher J. Hamaty

(57) ABSTRACT

A system, method and computer program product are provided for minimizing the duration of a risk-assessment scan. Initially, a plurality of risk-assessment modules are selected each including vulnerability checks associated with a risk-assessment scan. Thereafter, a first set of ports is determined. Such first set of ports is required for communicating with network components subject to the risk-assessment modules associated with the risk-assessment scan. A port scan is subsequently executed on the first set of ports. Based on such port scan, a second set of ports is determined which includes ports unavailable for communicating with the network components subject to the risk-assessment modules associated with the risk-assessment scan. The risk-assessment modules associated with the second set of ports may then be disabled to minimize the duration of the risk-assessment scan.

15 Claims, 6 Drawing Sheets

SYSTEM, METHOD AND COMPUTER PROGRAM PRODUCT FOR IMPROVED EFFICIENCY IN NETWORK ASSESSMENT UTILIZING A PORT STATUS PRE-QUALIFICATION PROCEDURE

FIELD OF THE INVENTION

The present invention relates to risk-assessment scanning methods, and more particularly to risk-assessment scanning with improved efficiency.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is ongoing, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

During the course of scanning, such security risk-assessment tools often open remote network connections to various target systems. Most of these connections rely on Transmission Control Protocol/Internet Protocol (TCP/IP) connectivity to establish communications, and test for security risks. There are many of such security vulnerabilities. As such, testing for the presence of the vulnerabilities can become quite time consuming, especially when auditing a network consisting of hundreds or thousands of systems.

Most vulnerabilities are specific to a certain network service [e.g. Web servers via Hypertext Transfer Protocol (HTTP), or file servers via File Transfer Protocol (FTP)]. Each of these services is assigned to certain standard TCP ports. A port is a "logical connection place" by which a client program specifies a particular server program on a computer in a network. Higher-level applications that use TCP/IP, such as FTP and HTTP, have ports with pre-assigned numbers. These are referred to as "well-known ports" that have been assigned by the Internet Assigned Numbers Authority. Other application processes may be given port numbers dynamically for each connection. Port numbers range from 0 to 65535, totaling 65536. Ports 0 to 1024 are reserved for use by certain privileged services. For the HTTP service, port 80 is defined as a default number.

When the aforementioned security risk-assessment tools initiate a scan, connections must be established utilizing the foregoing ports. In view of the vast number of ports and the redundancy of their use, such process may be quite time consuming. This, in turn, results in high latencies during the scan.

Further latency may be incurred if the security risk-assessment scan is executed on a port that is unavailable or inactive. Typically, security risk-assessment tools delay a predetermined amount of time, i.e. a timeout, before abandoning a scan on an unavailable or inactive port. Across numerous target systems with numerous unavailable or inactive ports, this delay can be compounded to a significant sum.

There is thus a need for reducing such latencies in risk-assessment scanning, and particularly achieving such goal by addressing the inefficiencies incurred when establishing port connections and initiating scans on unavailable or inactive ports.

DISCLOSURE OF THE INVENTION

A system, method and computer program product are provided for minimizing the duration of a risk-assessment scan. Initially, a plurality of risk-assessment modules are selected each including vulnerability checks associated with a risk-assessment scan. Thereafter, a first set of ports is determined. Such first set of ports is required for communicating with network components subject to the risk-assessment modules associated with the risk-assessment scan. A port scan is subsequently executed on the first set of ports. Based on such port scan, a second set of ports is determined which includes ports unavailable for communicating with the network components subject to the risk-assessment modules associated with the risk-assessment scan. The risk-assessment modules associated with the second set of ports may then be disabled to minimize the duration of the risk-assessment scan.

In one embodiment, a plurality of the risk-assessment modules each may have the same port associated therewith. Such redundancy in the first set of ports may be removed prior to executing the port scan to further minimize the duration of the risk-assessment scan. As an option, the risk-assessment modules may be user-specified.

In another aspect, a system, method and computer program product are provided for minimizing the duration of the risk-assessment scan. Initially, the risk-assessment modules may be selected for execution during the risk-assessment scan. As set forth earlier, the risk-assessment modules each include vulnerability checks. Next, a set of ports is identified for communicating with network components. Thereafter, a port scan of the set of ports is executed. Based on such port scan, the set of ports is modified. In particular, the set of ports is modified to include only ports available for communicating with the network components subject to the risk-assessment modules associated with the risk-assessment scan. At such time, the port associated with each selected risk-assessment module may be compared with the modified set of ports. Based on the comparison, the execution of the risk-assessment modules may be conditionally disabled to minimize the duration of the risk-assessment scan.

DESCRIPTION OF THE PREFERRED EMBODIMENTS

Figure 1:
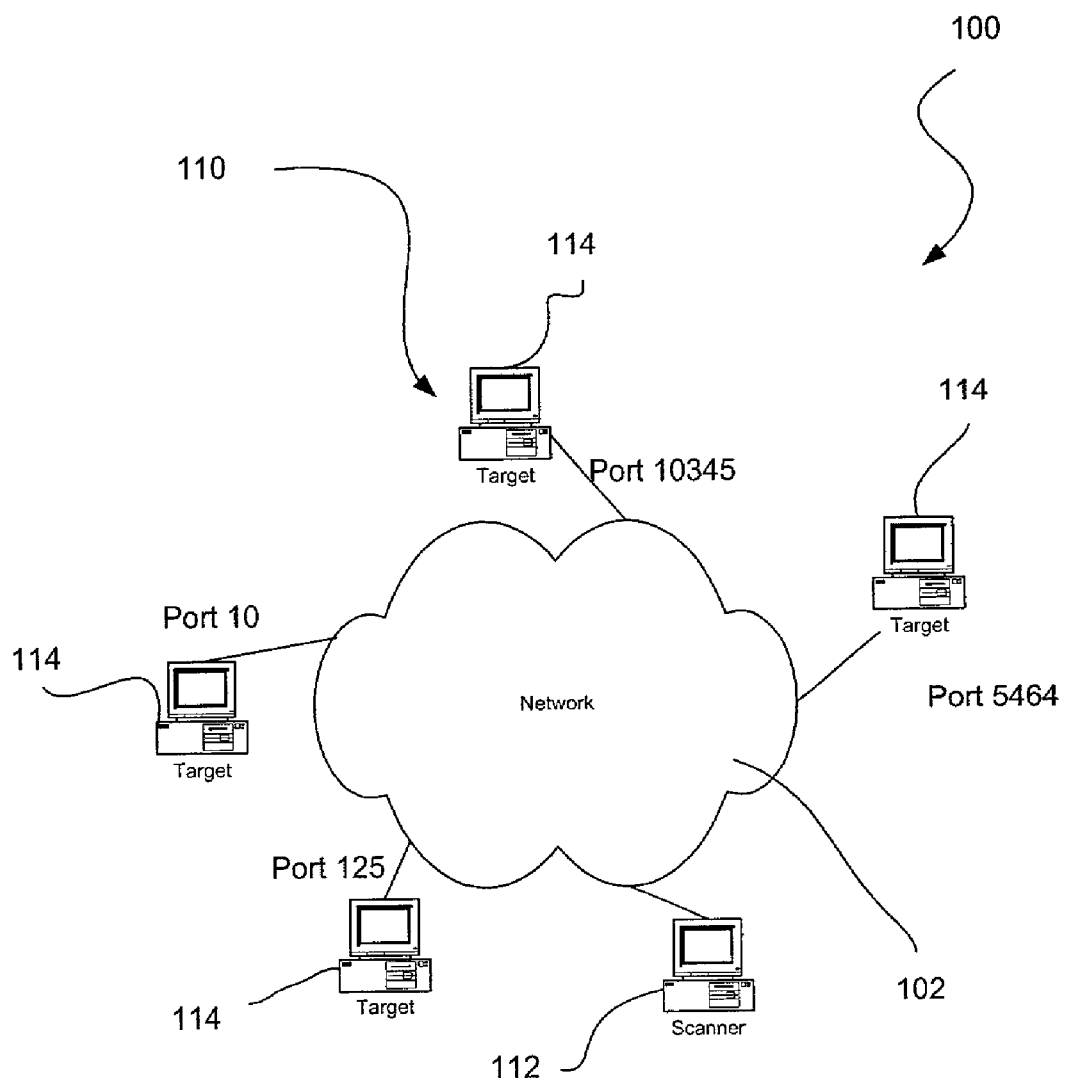
FIG. 1 illustrates an exemplary network environment in which the present embodiment may be implemented.

FIG. 1 illustrates an exemplary network environment 100 in which the present embodiment may be implemented. As shown, such network environment 100 includes a network 102 that may take any form including, but not limited to a local area network (LAN), a wide area network (WAN) such as the Internet, etc.

Coupled to the network 102 is a plurality of components 110 which may take the form of desktop computers, lap-top computers, hand-held computers, printers or any other type of computing hardware/software. In the context of the present invention, a plurality of target components 114 are provided which are coupled to at least one scanning computer 112 via the network 102. As shown in FIG. 1, each of the target components 114 and various sub-components thereof may be accessed via different ports, i.e. 10, 125, 10345, etc.

Figure 2:
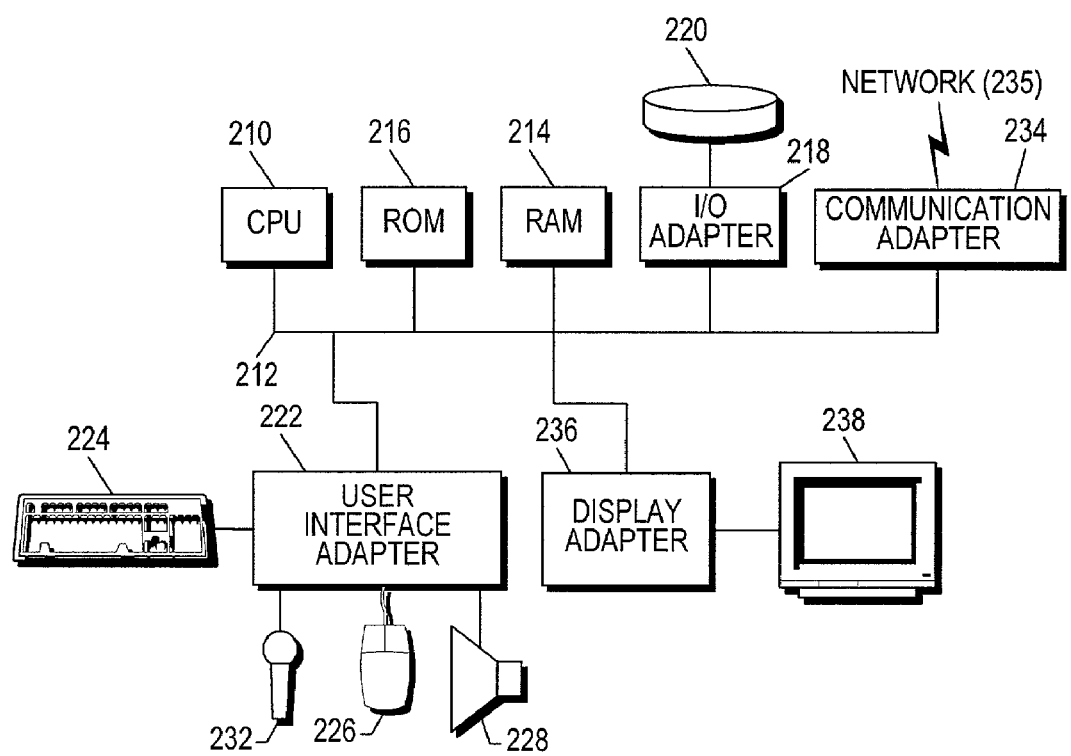
FIG. 2 shows a representative hardware environment associated with the components of FIG. 1, in accordance with one embodiment.

FIG. 2 shows a representative hardware environment associated with the components 110 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
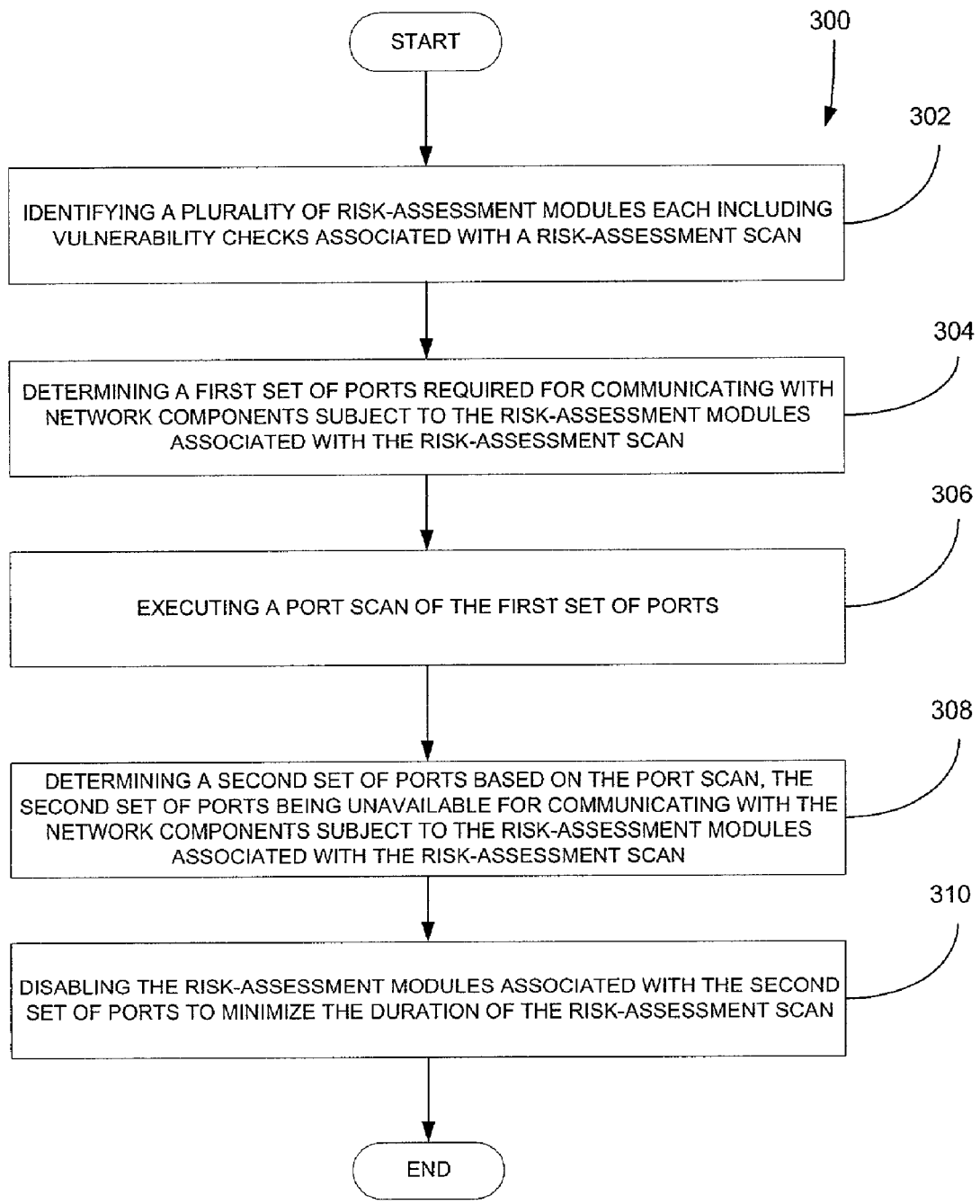
FIG. 3 illustrates a method for minimizing the duration of a risk-assessment scan adapted for detecting vulnerabilities utilizing various risk-assessment modules.

FIG. 3 illustrates a method 300 for minimizing the duration of a risk-assessment scan adapted for detecting vulnerabilities utilizing various risk-assessment modules. In the context of the present description, these risk-assessment modules refer to different functions that work in conjunction to perform a risk-assessment scan. Examples of risk-assessment modules will be set forth in greater detail during reference to FIG. 4. Moreover, the aforementioned vulnerabilities may include any aspect of the target computer 114 that would make it susceptible to an attack or intrusion by a hacker.

Initially, in operation 302, a plurality of risk-assessment modules are identified each including vulnerability checks associated with a security risk-assessment scan. In one embodiment, a manually-selected set of modules may be employed. Thereafter, in operation 304, a first set of ports is determined. Such first set of ports includes those required for communicating with network components 110 subject to the risk-assessment modules associated with the risk-assessment scan.

A port scan is subsequently executed on the first set of ports in operation 306. As is well known, a port scan includes a series of messages sent to a computer to identify which computer network services, each associated with a port number 412, the computer provides. In use, the port scan includes sending a message to each port, one at a time. The kind of response received indicates whether the port is available or not.

By limiting the port scan to only those associated with the selected, pertinent risk-assessment modules, a port scan of all 65,536 ports avoided. This, in turn, reduces the overall latency associated with the risk-assessment scan.

Based on such port scan, a second set of ports is determined in operation 308. The second set of ports includes those which are unavailable for communicating with the network components 110 subject to the risk-assessment modules associated with the risk-assessment scan. As an option, a port may be added to the second set of ports (those that are unavailable) if a connection to the port times out. By being added to the second set of ports, such ports may also be removed from the "global list" of ports that is used when selecting the first set of ports during another scan.

By this design, the risk-assessment modules associated with the second set of ports may then be disabled to minimize the duration of the risk-assessment scan. Note operation 310. In the present description, a risk-assessment module may be disabled by any mechanism that precludes such module from increasing the latency of the system.

As is well known, such risk-assessment modules often require the cessation of a predetermined timeout before rendering the scan a failed attempt. By disabling risk-assessment modules which would otherwise be executed on an unavailable or inactive port, the overall latency associated with the risk-assessment scan is reduced by avoiding the foregoing timeout scenario.

Figure 4:
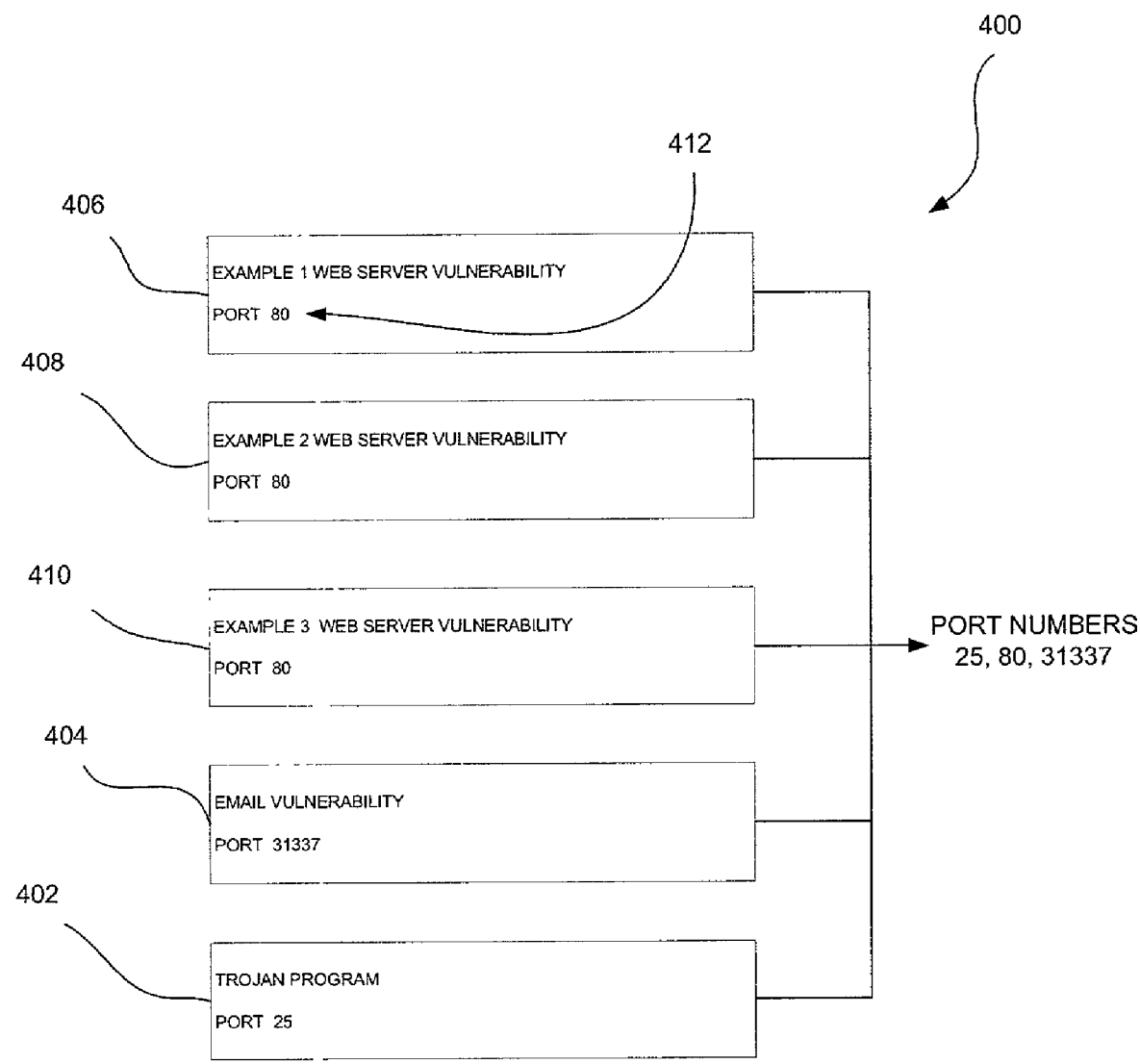
FIG. 4 illustrates numerous risk-assessment modules each specially adapted to detect a certain type of vulnerability.

FIG. 4 illustrates numerous risk-assessment modules 400 each specially adapted to detect a certain type of vulnerability. For example, a first risk-assessment module 402 may be provided to deal with "Trojan" programs, and a second risk-assessment module 404 may be provided to seek out e-mail vulnerabilities. Still yet, first, second and third web server risk-assessment modules 406, 408 and 410 may be provided to deal with web server vulnerabilities using various methods.

As shown in FIG. 4, each of the risk-assessment modules 400 has a port 412 associated therewith. In one embodiment, the risk-assessment modules 400 may have a port number identifier stored therewith. As mentioned earlier, such information may be used to determine the first set of ports in accordance with operation 304 of FIG. 3.

It should be noted that many of the risk-assessment modules 400 each may have the same port 412 associated therewith. Such redundancy in the first set of ports may be removed prior to executing the port scan to still further minimize the duration of the risk-assessment scan.

Figure 5:
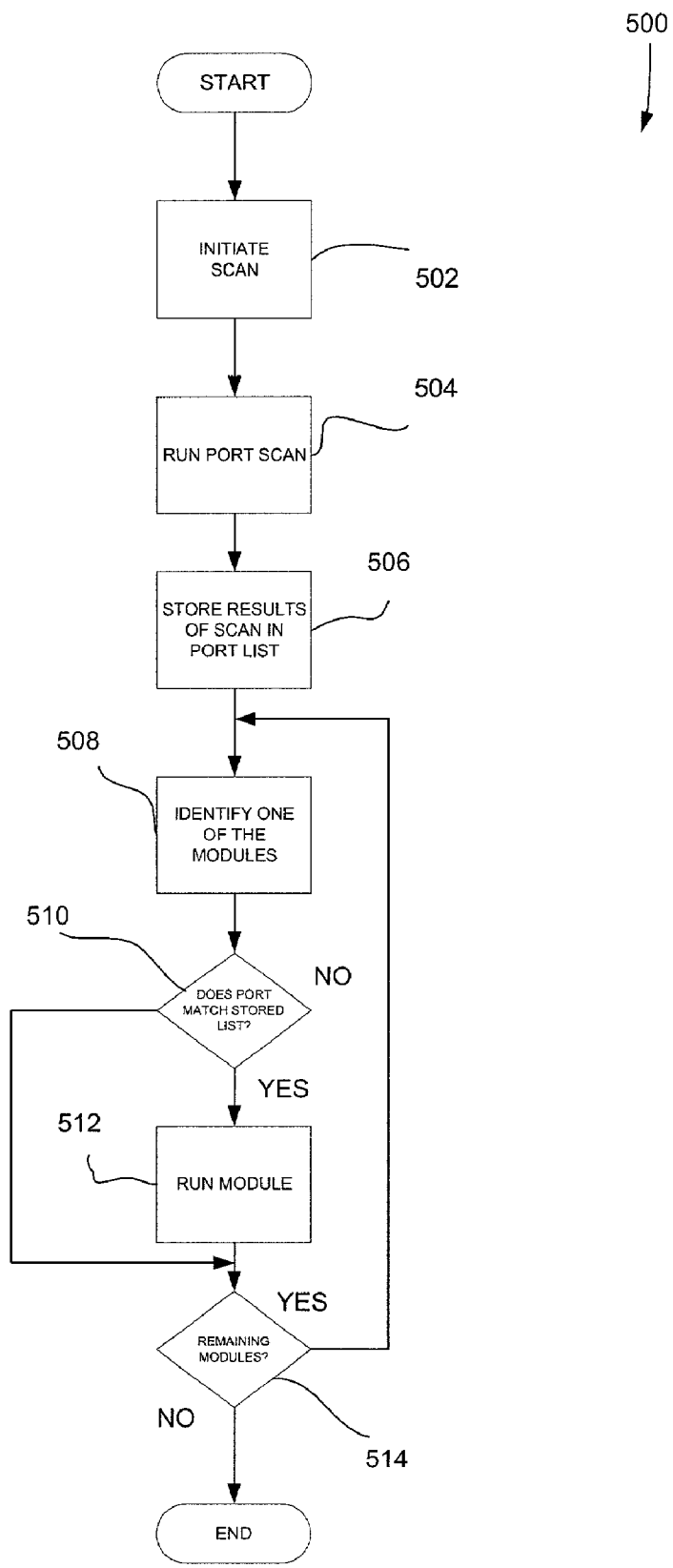
FIG. 5 illustrates a more comprehensive method for minimizing the duration of the risk-assessment scan.

FIG. 5 illustrates a more comprehensive method 500 for minimizing the duration of the risk-assessment scan. Initially, in operation 502, the scan is initiated. During such operation, a set of ports to be scanned is identified.

In one embodiment, such set of ports may include all 65,536 ports to provide a thorough scan. As an option, such set of ports may include only those that are required for communicating with network components 110 subject to the risk-assessment modules 400 associated with the risk-assessment scan. Such option may reduce latencies associated with the risk-assessment scan. More information regarding operation 502 will be set forth in greater detail during reference to FIG. 6.

In still another embodiment, the detection of vulnerabilities on unknown or unauthorized may be accomplished by designating certain unconventional ports in the set of ports to be scanned. By allowing a user to specify a range of ports to scan, unidentified high ports may be targeted by risk-assessment modules 400 that identify backdoors, Trojans or DDoS agents that had been recompiled to run on ports other than their default "known" port. Service identification on these high ports could also be employed to identify unauthorized remote services that had been installed on high ports to conceal their presence. Of course, scan latencies will increase as a function of the number of ports selected.

A port scan of the set of ports is then executed in operation 504 in a manner similar to operation 306 of FIG. 3. As mentioned earlier, by limiting the port scan to only those associated with the selected risk-assessment modules 400, the overall latency of the risk-assessment scan is reduced.

In the case where multiple target components 114 are being scanned, the port scan may optionally be used to identify which target components 114 may be skipped during the risk-assessment scan. Specifically, target components 114 may be removed from the risk-assessment scan if port(s) thereof do not respond during the port scan.

As a result of the port scan, a second set of ports is identified which include ports that are either unavailable or inactive. As such, the original set of ports may be modified to include only ports available for communicating with the network components 110 subject to the risk-assessment modules 400 of the risk-assessment scan. The results of the port scan may thus be stored in the form of the modified list in operation 506. As an option, the modified set may be referred to as a third set of ports which includes the first original set of ports and excludes the second set of unavailable or inactive ports.

Next, in operation 508, the risk-assessment modules 400 may be selected from those available for execution during the risk-assessment scan. At such time, the port associated with each selected risk-assessment module 400 (as determined by the data structure of FIG. 4) may be compared with the modified set of ports in decision 510.

Based on the comparison in decision 510, the execution of the risk-assessment modules 400 may be conditionally disabled to minimize the duration of the risk-assessment scan. In particular, the vulnerability checks of the risk-assessment module 400 may be executed if the port associated with the risk-assessment module 400 matches at least one port of the modified third set of ports. Note operation 512.

If, on the other hand, the port associated with the risk-assessment module 400 does not match at least one port of the modified third set of ports, the risk-assessment module 400 may be disabled. By disabling risk-assessment modules 400 which would otherwise be executed on an unavailable or inactive port, the overall latency associated with the risk-assessment scan is reduced.

Once completed, the method 500 determines if any additional risk-assessment modules 400 must be executed in decision 514. If so, the process is continued by identifying another one of the risk-assessment modules 400 in operation 508, etc.

When executing risk-assessment modules 400 that perform denial of service checks, service is sometimes disabled when a vulnerability is detected by crashing the service. In such case, the particular port involved may be removed from the "global list" of ports that is used when selecting the first set of ports during another scan.

Similarly, when executing risk-assessment modules 400 that scan for Trojans, denial of service, and back door-type vulnerabilities on a port with a high port number; such high port may be removed from the "global list" list upon any of such vulnerabilities being found. This may prevent other similar types of modules from accessing such port.

Figure 6:
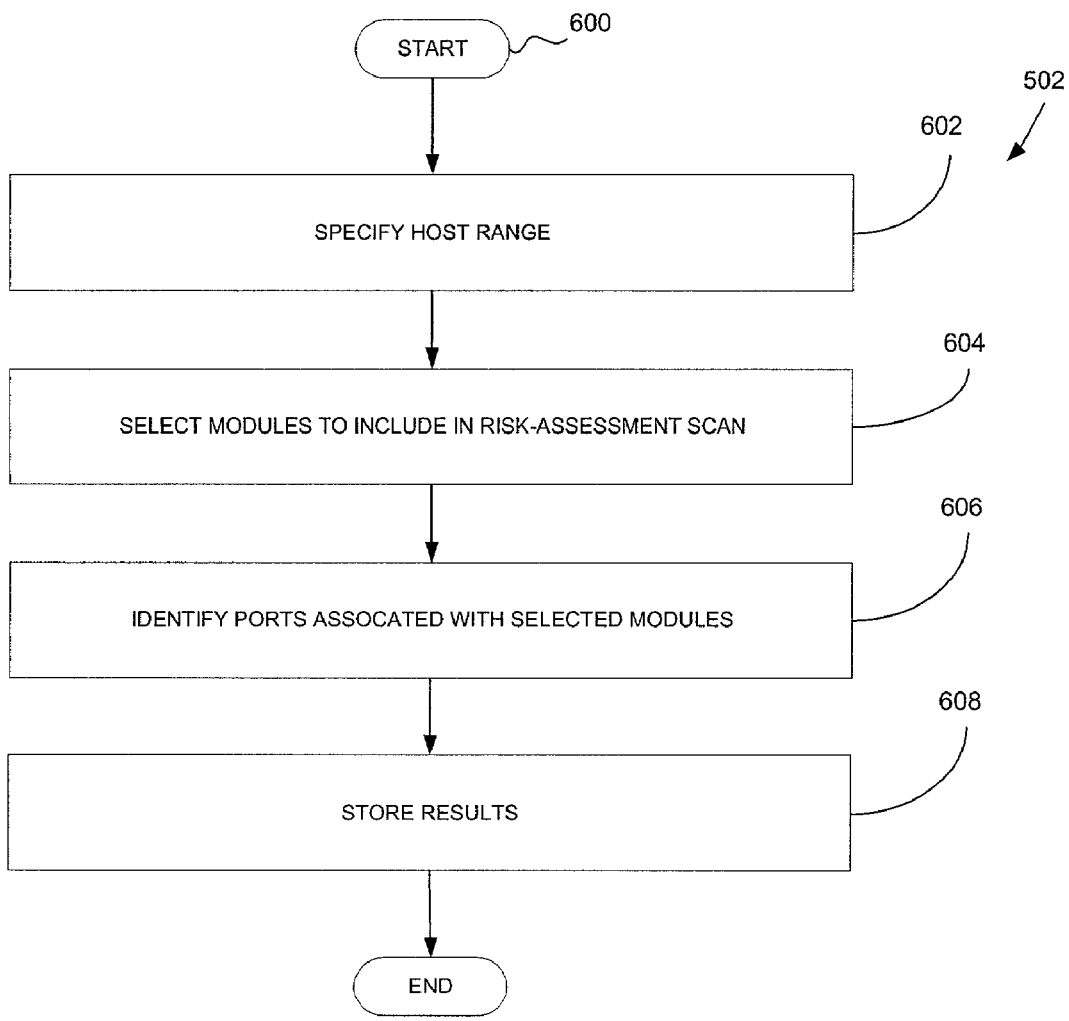
FIG. 6 illustrates a method for initiating the risk-assessment scan of FIG. 5.

FIG. 6 illustrates a method 600 for initiating a risk-assessment scan in accordance with operation 502 of FIG. 5. As shown, a host range is first identified in operation 602. Such host range includes an identification of all target components 114 to be included in the risk-assessment scan. In one embodiment, a manually-selected set of target components 114 may be scanned. As such, every target component 114 is subjected to operations 504–514 of FIG. 5 during use.

Thereafter, in operation 604, risk-assessment modules 400 to be included in the risk-assessment scan are selected. Operation 604 may be accomplished manually or automatically. Utilizing the data structure of FIG. 4, the ports associated with the risk-assessment modules 400 are identified in preparation for the port scan of operation 504 of FIG. 5. See operation 606. Preferably, such set of ports is stored in operation 608.

As each scan begins, the risk-assessment tool evaluates and lists the ports required for communication by each of the different risk-assessment modules 400 that are to be performed. This enables a plurality of latency-reducing techniques:

By removing redundancy from this list, the risk-assessment tool may minimize repeated connections to the target components 114, and hence minimize the total time required to complete a risk-assessment scan. For example, twenty (20) unique vulnerabilities against web servers, each existing by virtue of separate software flaws, may all require a connection to a remote target component 114 on TCP port 80. In such example, port 80 would only have to be scanned once. It should be noted that User Datagram Protocol (UDP) ports may be specified as well as TCP ports.

Further, by determining the ports required for all selected risk-assessment modules 400, the risk-assessment tool is able to eliminate the need to run an exhaustive port scan (i.e. an audit of open, or "listening" ports).

Still yet, by determining which of those required ports are inactive during the scan, the risk-assessment tool is then able to subsequently disqualify all risk-assessment modules 400 which require such inactive ports.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of minimizing the duration of a risk-assessment scan, comprising:
   a) selecting a plurality of risk-assessment modules for execution during a risk-assessment scan, the risk-assessment modules each including vulnerability checks, and requiring communication via at least one predetermined port;
   b) determining a set of ports for communicating with a select number of network components;
   c) executing a port scan of only the set of ports associated with the selected risk-assessment modules and the network components, for reducing the number of ports scanned during the port scan, wherein latency is reduced since a port scan involving 65,536 ports is avoided;
   d) modifying the set of ports based on the port scan, the set of ports being modified to include only ports available for communicating with the network components;
   e) comparing the port associated with each selected risk-assessment module with the modified set of ports; and
   f) conditionally disabling the execution of the risk-assessment modules based on the comparison to minimize the duration of the risk-assessment scan.

2. A computer program product embodied on a computer readable medium for minimizing the duration of a risk-assessment scan, comprising:
   a) computer code for selecting a plurality of risk-assessment modules for execution during a risk-assessment scan, the risk-assessment modules each including vulnerability checks, and requiring communication via at least one predetermined port;
   b) computer code for determining a set of ports for communicating with network components;
   c) computer code for executing a port scan of the set of ports associated with the selected risk-assessment modules and the network components, for reducing the number of ports scanned during the port scan, wherein latency is reduced since a port scan involving 65,536 ports is avoided;
   d) computer code for modifying the set of ports based on the port scan, the set of ports being modified to include only ports available for communicating with the network components;
   e) computer code for comparing the port associated with each selected risk-assessment module with the modified set of ports; and
   f) computer code for conditionally disabling the execution of the risk-assessment modules based on the comparison to minimize the duration of the risk-assessment scan.

3. A method of minimizing the duration of a risk-assessment scan, comprising:
   a) selecting a plurality of risk-assessment modules each including vulnerability checks associated with a risk-assessment scan, and requiring communication via at least one predetermined port;
   b) determining a first set of ports required for communicating with network components subject to the risk-assessment modules associated with the risk-assessment scan;
   c) executing a port scan of only the first set of ports associated with the selected risk-assessment modules, for reducing the number of ports scanned during the port scan, wherein latency is reduced since a port scan involving 65,536 ports is avoided;
   d) determining a second set of ports based on the port scan, the second set of ports being unavailable for communicating with the network components subject to the risk-assessment modules associated with the risk-assessment scan;
   e) disabling the risk-assessment modules associated with the second set of ports to minimize the duration of the risk-assessment scan;
   f) storing a third set of ports including the first set of ports and excluding the second set of ports; and
   g) comparing the port associated with each risk-assessment module with the stored third set of ports;
   h) wherein the risk-assessment module is disabled if the port associated with the risk-assessment module does not match at least one port of the stored third set of ports.

4. The method as recited in claim 3, wherein a plurality of the risk-assessment modules each have the same port associated therewith, and redundancy in the first set of ports is removed prior to executing the port scan.

5. The method as recited in claim 3, wherein the risk-assessment modules are user-specified.

6. The method as recited in claim 3, and further comprising performing the vulnerability checks of the risk-assessment module if the port associated with the risk-assessment module matches at least one port of the stored third set of ports.

7. The method as recited in claim 3, wherein the risk-assessment modules include a web server vulnerability module with a predetermined port of 80, an e-mail vulnerability module with a predetermined port of 31337, and a Trojan program vulnerability module with a predetermined port of 25.

8. A computer program product embodied on a computer readable medium for minimizing the duration of a risk-assessment scan, comprising:
   a) computer code for selecting a plurality of risk-assessment modules each including vulnerability checks associated with a risk-assessment scan, and requiring communication via at least one predetermined port;
   b) computer code for determining a first set of ports required for communicating with network components subject to the risk-assessment modules associated with the risk-assessment scan;
   c) computer code for executing a port scan of the first set of ports associated with the selected risk-assessment modules, for reducing the number of ports scanned during the port scan, wherein latency is reduced since a port scan involving 65,536 ports is avoided;
   d) computer code for determining a second set of ports based on the port scan, the second set of ports being unavailable for communicating with the network components subject to the risk-assessment modules associated with the risk-assessment scan;
   e) computer code for disabling the risk-assessment modules associated with the second set of ports to minimize the duration of the risk-assessment scan;
   f) computer code for storing a third set of ports including the first set of ports and excluding the second set of ports; and g) computer code for comparing the port associated with each risk-assessment module with the stored third set of ports;

h) wherein the risk-assessment module is disabled if the port associated with the risk-assessment module does not match at least one port of the stored third set of ports.

9. The computer program product as recited in claim 8, wherein a plurality of the risk-assessment modules each have the same port associated therewith, and redundancy in the first set of ports is removed prior to executing the port scan.

10. The computer program product as recited in claim 8, wherein the risk-assessment modules are user-specified.

11. The computer program product as recited in claim 8, and further comprising computer code for performing the vulnerability checks of the risk-assessment module if the port associated with the risk-assessment module matches at least one port of the stored third set of ports.

12. A system for minimizing the duration of a risk-assessment scan, comprising:

a) logic for selecting a plurality of risk-assessment modules each including vulnerability checks associated with a risk-assessment scan, and requiring communication via at least one predetermined port;

b) logic for determining a first set of ports required for communicating with network components subject to the risk-assessment modules associated with the risk-assessment scan;

c) logic for executing a port scan of only the first set of ports associated with the selected risk-assessment modules, for reducing the number of ports scanned during the port scan, wherein latency is reduced since a port scan involving 65,536 ports is avoided;

d) logic for determining a second set of ports based on the port scan, the second set of ports being unavailable for communicating with the network components subject to the risk-assessment modules associated with the risk-assessment scan;

e) logic for disabling the risk-assessment modules associated with the second set of ports to minimize the duration of the risk-assessment scan;

f) logic for storing a third set of ports including the first set of ports and excluding the second set of ports; and g) logic for comparing the port associated with each risk-assessment module with the stored third set of ports;

h) wherein the risk-assessment module is disabled if the port associated with the risk-assessment module does not match at least one port of the stored third set of ports.

13. The system as recited in claim 12, wherein a plurality of the risk-assessment modules each have the same port associated therewith, and redundancy in the first set of ports is removed prior to executing the port scan.

14. The system as recited in claim 12, wherein the risk-assessment modules are user-specified.

15. The system as recited in claim 12, and further comprising logic for performing the vulnerability checks of the risk-assessment module if the port associated with the risk-assessment module matches at least one port of the stored third set of ports.

* * * * *